Dec. 12, 1967     G. A. WATTS     3,357,501
TWO-WAY REVERSIBLE GANG PLOW
Original Filed Nov. 17, 1961     5 Sheets-Sheet 1

INVENTOR.
GLEN A. WATTS,
BY
McMorrow - Berman & Davidson
ATTORNEYS.

Dec. 12, 1967 G. A. WATTS 3,357,501
TWO-WAY REVERSIBLE GANG PLOW
Original Filed Nov. 17, 1961 5 Sheets-Sheet 5

INVENTOR.
GLEN A. WATTS,
BY
McMorrow, Berman & Davidson
ATTORNEYS.

United States Patent Office 3,357,501
Patented Dec. 12, 1967

3,357,501
TWO-WAY REVERSIBLE GANG PLOW
Glen A. Watts, Caldwell, Idaho, assignor to Deere & Company, Moline, Ill., a corporation of Delaware
Continuation of application Ser. No. 153,036, Nov. 17, 1961. This application May 24, 1965, Ser. No. 463,452
9 Claims. (Cl. 172—227)

This application is a continuation of copending application Ser. No. 153,036, filed Nov. 17, 1961, now abandoned.

This invention relates to a novel two-way reversible gang plow.

The primary object of the invention is the provision of an efficient and easily operated plow of the kind indicated which is adapted to trail a tractor having a hydraulically actuated three-point hitch or drawbar assembly, the frame of the plow being supported, at its rear end, on a relatively stationary furrow-engaging wheel assembly, and, at its forward end, on the tractor drawbar assembly, to swing on a horizontal axis, for selectively engaging either of its two plow gangs with the ground.

Another object of the invention is the provision of a plow of the character indicated above, wherein the furrow-engaging or furrow wheel assembly is universally connected to the plow frame at the rear end of the frame, and the frame is horizontally hinged, at its forward end, to the fore-and-aft extending draft links of a tractor and which is free to move vertically relative thereto.

A further object of the invention is the provision of a plow of the character indicated above, wherein means mounted on the plow frame and connected to the stationary drawbar of an associated tractor and to the furrow wheel assembly, serves to depress and elevate the wheel assembly, for the purpose of determining the depth of cut of the gangs of the plow assembly in the ground, and for the purposes of elevating the frame and the plow assembly off the ground, preliminary to rotating the plow assembly and a selected plow gang thereof into plowing engagement with the ground, after a reversal of plow gangs.

A still further object of the invention is the provision in a plow of the character indicated above, of positive-acting safety means which serves to limit the turning radius of the plow relative to the tractor as well as rotation of the plow gangs to either side of the plow.

Other important objects and advantageous features of the invention will be apparent from the following description and the accompanying drawings, wherein, for purposes of illustration only, a specific form of the invention is set forth in detail.

In the drawings:
FIGURE 1 is a top plan view of a plow of the present invention, showing in full lines, the plow assembly positioned for engagement in the ground, at one side of a guide furrow, and, in phantom lines, the assembly reversed and positioned for engagement in the ground, at the opposite side of the guide furrow, the plow frame being supportably connected to the hydraulically actuated drawbar assembly of a tractor;

FIGURE 8 is a perspective view, on a reduced scale, of the plow assembly and its frame.

Figure 1:
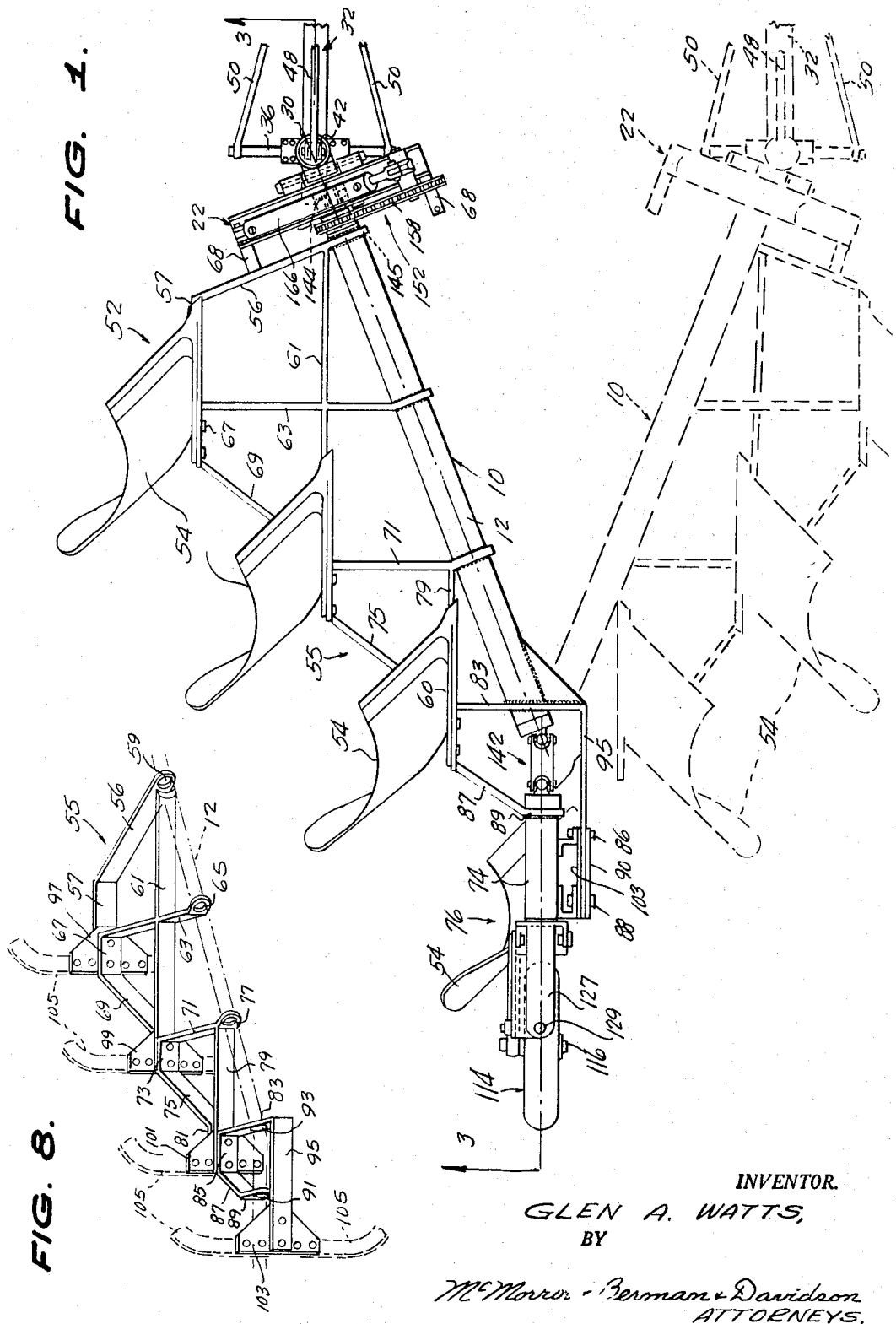
Figure 2:
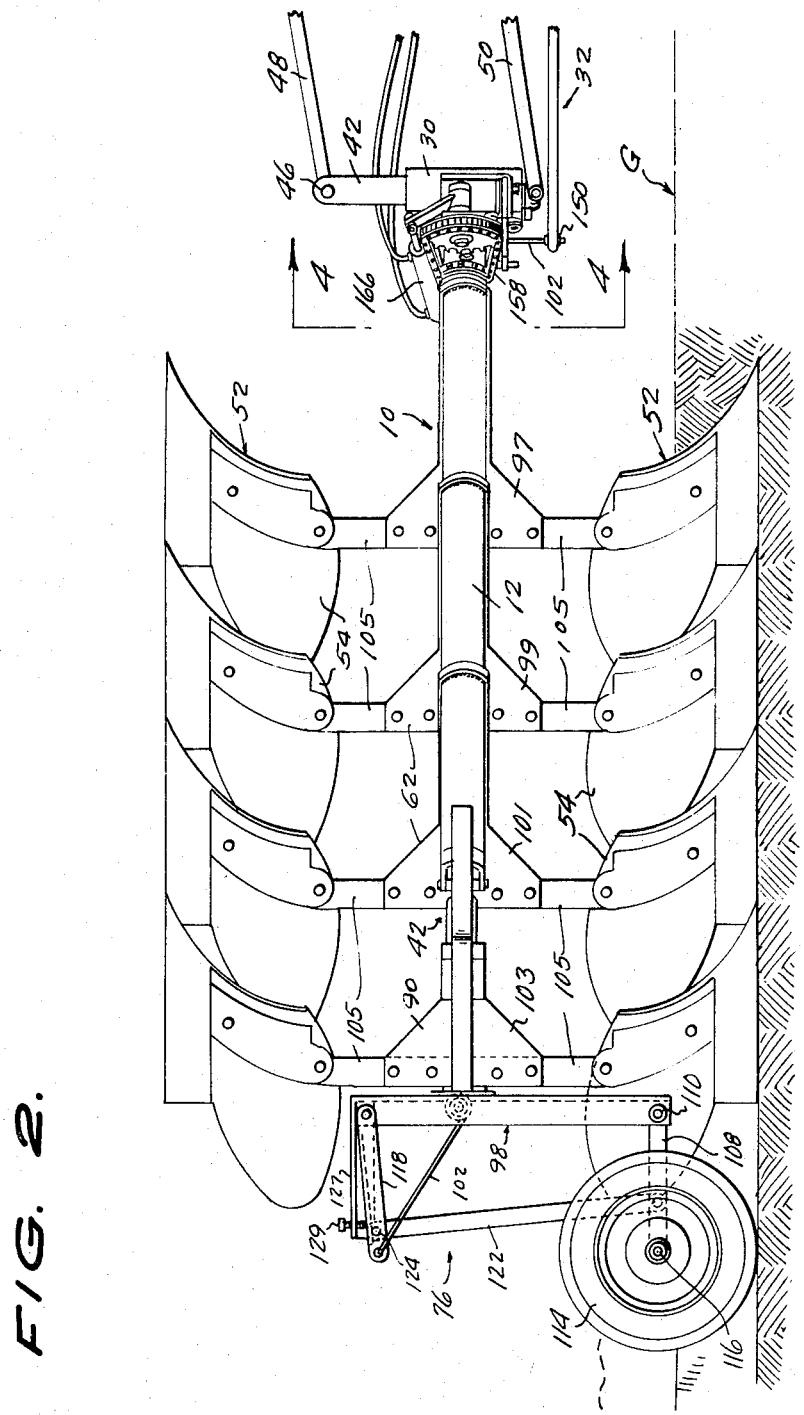
FIGURE 2 is a side elevation of FIGURE 1, showing the furrow wheel engaged in a guide groove, and a plow gang engaged in the ground.

Referring in detail to the drawings, wherein like numerals designate like parts throughout the several views, the illustrated plow 10 includes an articulated non-rotatable frame having a longitudinally elongated, generally horizontal relatively stationary tube or front segment 11, on which is circumposed a rotatable carrier tube 12, whose rear end is engaged by a stop collar 14 secured on the stationary tube 11, as by means of a set screw 16. The forward end of the carrier tube 12 is engaged with a vertical flange 18, fixed to the forward end of the stationary tube 11. A sprocket toothed annulus 20 surrounds and is fixed to the carrier tube 12, adjacent its forward end.

Figure 3:
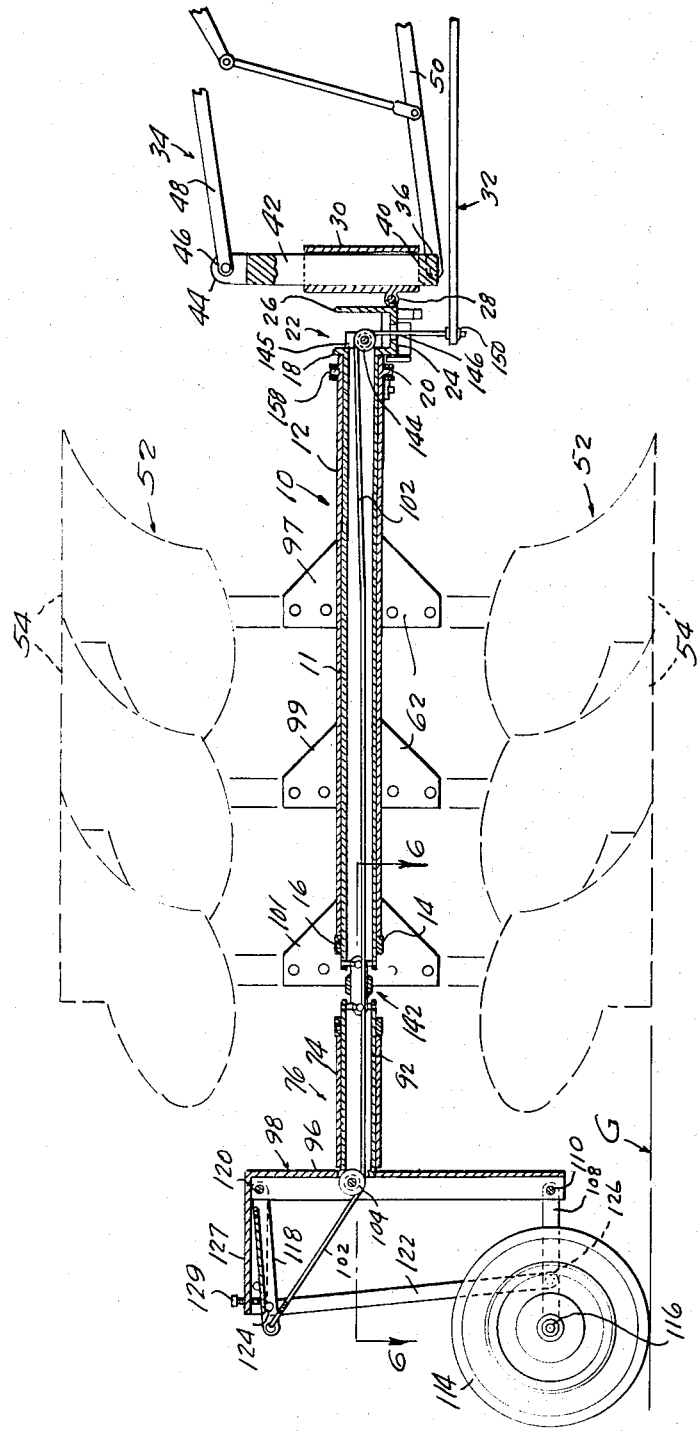
FIGURE 3 is a horizontal section taken on the line 3—3 of FIGURE 1.

The vertical flange 18 is the rear upstanding flange of a transversely elongated horizontal channel 22, which includes a bottom wall 24, and an upstanding forward flange 26. As shown in FIGURE 3, the forward channel flange 26 is horizontally hinged, as indicated at 28, on a level with the bottom flange 24, to a lower rear part of an upstanding vertically elongated, open-ended cylindrical pivot housing 30, which extends below the hinge 28, and rises above the channel 22, and is adapted to be positioned over the fixed drawbar 32 of a tractor (not shown) having, above the fixed drawbar 32, a hydraulically actuated, vertically movable drawbar assembly 34.

As shown in FIGURE 1, the fixed tractor drawbar 32 is a straight flat horizontal bar, to whose rear end is secured, as hereinafter described in detail, cable means for elevating and depressing the plow frame 10, relative to the ground G, the drawbar being lengthwise adjustable on the tractor for positioning the point of connection of the cable means thereto, under the forepart of the gang plow.

Fixed, as by welding 40, to the center of the cross bar 36, is an upstanding pivot pin 42, which is taller than and extends upwardly through the pivot housing 30. The pivot pin 42 has a clevis 44, on its upper end, which is pivoted, as indicated at 46, to the rear end of the upper swingable arm 48 of the movable drawbar assembly 34, which includes laterally spaced lower draft links or arms 50, which are connected to the cross bar 36.

A pair of similar, but reversed, and opposed plow gangs 52 are fixed to the rotary carrier tube 12 of the frame 10. The gangs 52 comprise moldboard plows 54 which are equally spaced lengthwise of the frame 10, adjacent plows 54 being in partially overlapping relationship. As shown in FIGURE 1, the plows 54 are in forwardly divergent relation to the frame 10 and are carried by a rotatable frame 55 which is shown in detail in FIGURE 8.

The frame 55 comprises a front bar 56, which extends laterally outwardly from the tube 12 and has an extension 57 which extends rearwardly from its rear end at an outward acute angle relative to the tube 12, the inner end of the front bar 56 having an opening 59 at its inward end, which receives the tube 12. A forward longitudinal bar 61 is fixed to the front bar 56, at the inward end thereof, and is parallel to and spaced laterally inwardly from the extension 57 and reaches rearwardly therebeyond. A forward V-shaped member comprises a forward bar 63, disposed at right angles to the extension 57 and having an opening 65, at its inward end which receives the tube 12. At its outward end the forward bar 63 merges into a flat intermediate portion 67, which is at the inward side of and parallels the rear end part of the extension 57. The intermediate portion 67 merges into a rear bar 69 which is rearwardly and laterally inwardly angled to the forward longitudinal bar 61. The forward bar 63 intersects and is fixed to the longitudinal bar 61.

The frame 55 further comprises a rear V-shaped member which comprises a forward bar 71, a flat intermediate portion 73, and a rearwardly and laterally inwardly angled rear bar 75. The forward bar has an opening 77, at its inward end, which receives the tube 12, and a rear longitudinal bar 79 is fixed to and extends rearwardly from the forward bar 71. The rear bar 75 has a longitudinal extension 81, on its rear end, which is disposed at the outward side of the rear longitudinal bar 79.

A rear frame member comprises a forward bar 83 which merges, at its laterally outward end, into a flat intermediate portion 85, which merges into a laterally inwardly and rearwardly angled rear bar 87, which terminates in a laterally inwardly extending extension 89, which has an opening 91, in which is secured the forward end of a longitudinal tubular housing 74. The forward bar 83 has, intermediate its ends, an opening 93 receiving the tube 12, and merges, at its laterally inward end, in a longitudinal bar 95 which extends inwardly therefrom and spacedly along the side of the housing 74 remote from the frame 55. The bars receiving the tube 12 are fixed thereto, as by means of weldings.

A front gusset plate 97 is disposed between and secured to the extension 57 and the intermediate portion 67. A forward intermediate gusset plate 99 is secured to the rear end of the forward longitudinal bar 61 and the intermediate portion 73; and a rear intermediate gusset plate 101 is secured to the rear end of the rear longitudinal bar 79 and the intermediate portion 85. A rear gusset plate 103 is secured to the rear end of the longitudinal bar 95. The gusset plates extend equally to opposite sides of the frame 55, and the standards 105 of related plows 54 are aligned and are secured to the gusset plates and extend in opposite directions therefrom.

The channel 22 has therein, at its ends, rearwardly extending stop arms 68, which serve as stops for the forward bar 56 of the frame 55, as the frame is rotated to either side of the frame 10. As also shown in FIGURE 6, the rear longitudinal bar 95 is fixed to the housing 74, by means of longitudinally spaced forward and rear brackets 78 and 80, respectively, traversed by bolts 86 and 88, respectively, which extend through the bar 95 and through the rear gusset plate 103 on which the rear plows are mounted.

The furrow wheel assembly 76 is secured to the rear segment 92 of the articulated non-rotatable frame, the segment 92 being tubular and disposed within the housing 74. A stop collar 94, secured to the tube 92 at its forward end, as by means of a set screw 95', and the web 96 of a normally perpendicular, vertically elongated channel bar 98 hold the housing from longitudinal sliding movement on the rear segment 92. The web 96 of the furrow wheel assembly 76 is suitably fixed to the rear end of the segment 92, at a location above the middle of the channel bar 98, where the web 96 is provided with an opening 100, for passing an operating cable 102 which extends through the tube 92, and is trained around the underside of a pulley 104 which is mounted between ears 106 extending rearwardly from the web 96, as shown in FIGURES 3 and 6.

A lower, rearwardly extending rock arm 108 is pivoted, at its rear end, on one end of a pivot pin 110, outside of one of the side flanges 112 of the channel bar 98, at the lower end thereof, and has at its rear end, a single furrow engaging wheel 114 at the laterally inward side thereof, in line with the housing 74, and journalled on a stub axle 116. The cable 102 is secured, at its rear end, to the rear end of an upper rock arm 118, vertically aligned with rock arm 108, and pivoted, at its rear end, as indicated at 120 to the channel bar 98, at the upper end thereof, and a link 122 extends between the upper and lower rock arms. The link 122 is pivoted, at its upper end, to the upper rock arm 118, at a point near the rear end thereof, as indicated at 124, and is pivoted, as indicated at 126, at its lower end, to an intermediate part of the lower rock arm 108, whereby the link 122 is in upwardly divergent relationship to the channel bar 98. A rearwardly extending fixed bar 127 extends rearwardly from the upper end of the channel bar 98, above the upper rock arm 118, and is traversed by a vertical stop screw 129, for limiting upward swinging of the upper rock arm 118, and hence of the furrow wheel 114.

Figure 6:
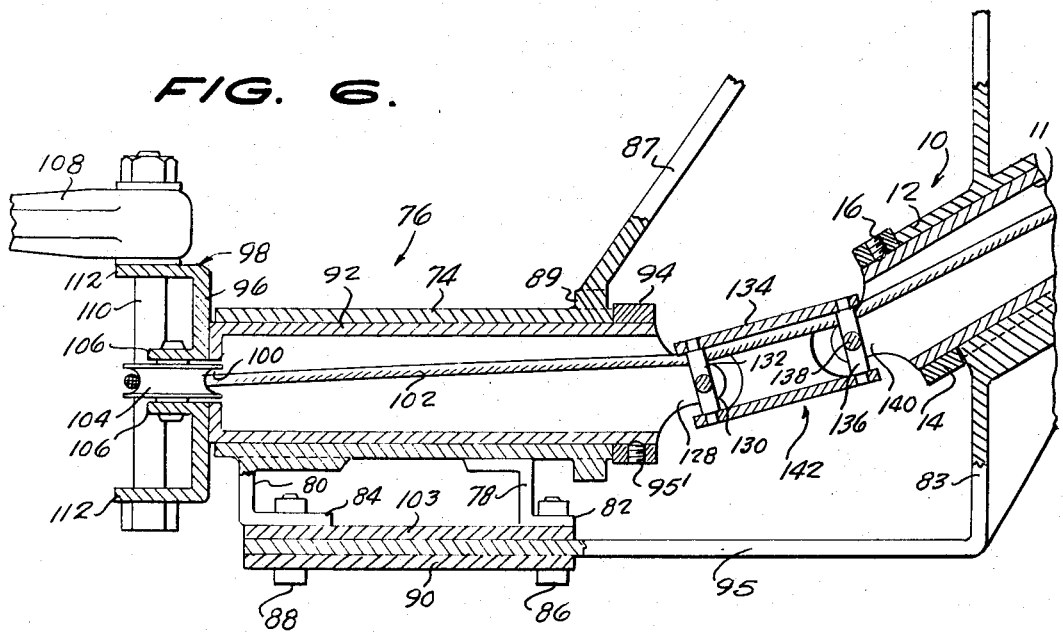
FIGURE 6 is an enlarged fragmentary horizontal section taken on the line 6—6 of FIGURE 3.
Figure 7:
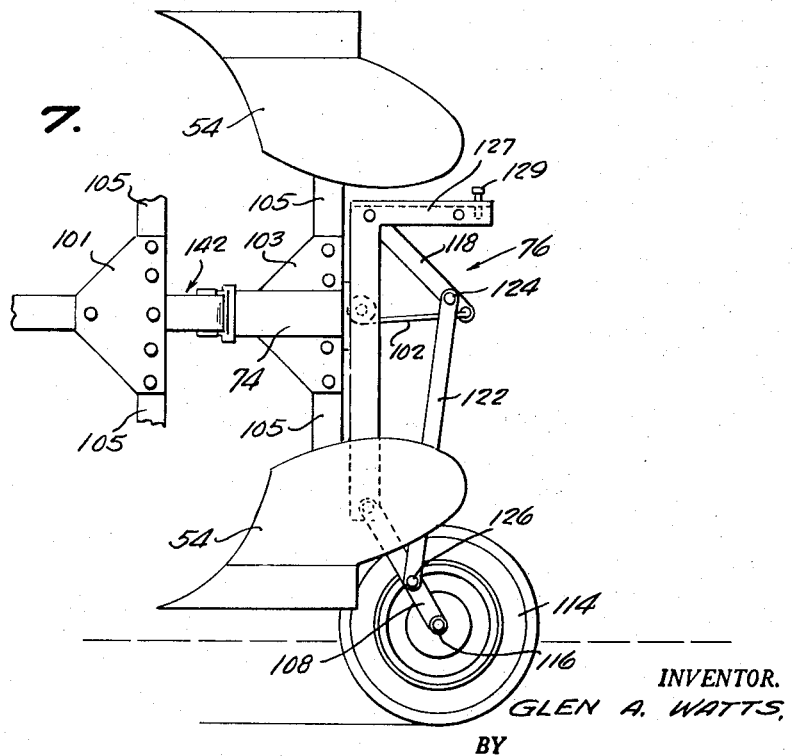
FIGURE 7 is a fragmentary side elevation of the plow, showing the furrow wheel assembly with its wheel in depressed position in a guide furrow.

As shown in FIGURE 6, the rear segment 92 has, on its forward end, a pair of laterally spaced ears 128 in which a first cross pin 130 is journalled, which carries, at its middle, a second cross pin 132 which is journalled, at its ends, in the sidewall of an intermediate segment 134, at the rear end thereof. At its forward end, the segment 134 has journalled in its sidewall the ends of a third cross pin 136, fixed on a fourth cross pin 138 which is journalled, at its ends, in spaced ears 140, on the rear end of the front segment 11. The pins 130, 132 form a rear universal joint and the pins 136, 138 form a front universal joint, the universal joint assembly 142 connecting the rear segment 92 and the front segment 11 together. The cable 102 extends forwardly through the intermediate segment 134, and forwardly through the front segment 11, and is trained downwardly over a pulley 144 mounted between plates 145 in the channel 22, and extends downwardly through an opening 146, provided in the bottom wall 24 of the channel 22, and is secured, as indicated at 150, to the tractor drawbar 32.

As a result of the foregoing arrangement, upward operation of the movable drawbar assembly 34 of the associated tractor, elevates the forward end of the plow 10, relative to the fixed tractor drawbar 32, so that the cable 102 is pulled forwardly through the plow 10 and pulls the upper rock arm 118 of the furrow wheel assembly 76 downwardly, thereby depressing the furrow wheel 114 and elevating the rear end of the plow 10, relative to the ground G, so that the plow gangs 52 are elevated out of contact with the ground G, and are free to be rotatably reversed.

An assembly 152 for reversing the plow gangs 52, by rotating the carrier tube 12 of the frame 55, comprises, as shown in FIGURES 1, 2, 4 and 5, a sprocket wheel 154, larger in diameter than the toothed annulus 20 on the carrier tube 12, which wheel is positioned behind one end of and is fixed on one end of a shaft 156 which is journalled over the annulus 20 and the sprocket wheel 154. A radial clevis lever arm 160 extends from the shaft 156 and is pivoted, at its outer end, as indicated at 162, to the free end of the piston rod 164 of a two-way hydraulic cylinder 166, whose cylinder 168 is pivoted, at its end remote from its piston rod, as indicated at 170, to and between the forward and rear walls of the channel 22, at the end of the channel remote from the sprocket wheel 154. Extension of the piston rod 164 in one direction, rotates the frame carrier tube 12, and hence the plow gangs 52 fixed thereto, to one side, and retraction of the piston rod rotates the tube 12 and the plow gangs 52 to the opposite sides of the non-rotatable frame 11, 134, 92.

Figure 4:
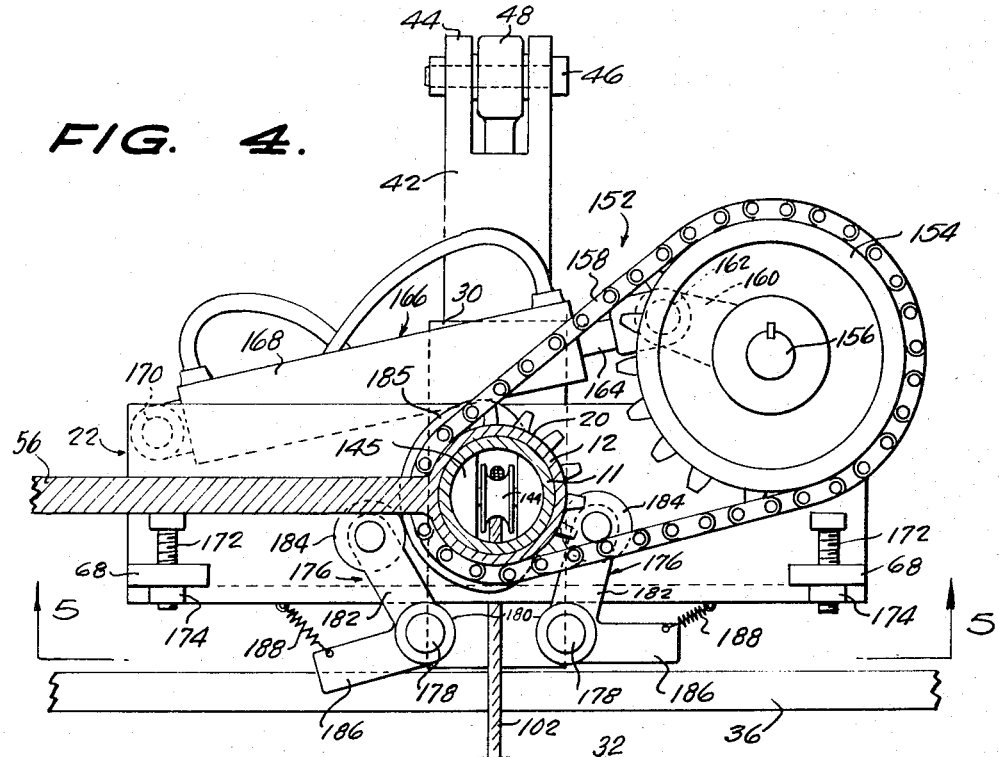
FIGURE 4 is an enlarged fragmentary vertical transverse section taken on the line 4—4 of FIGURE 2.
Figure 5:
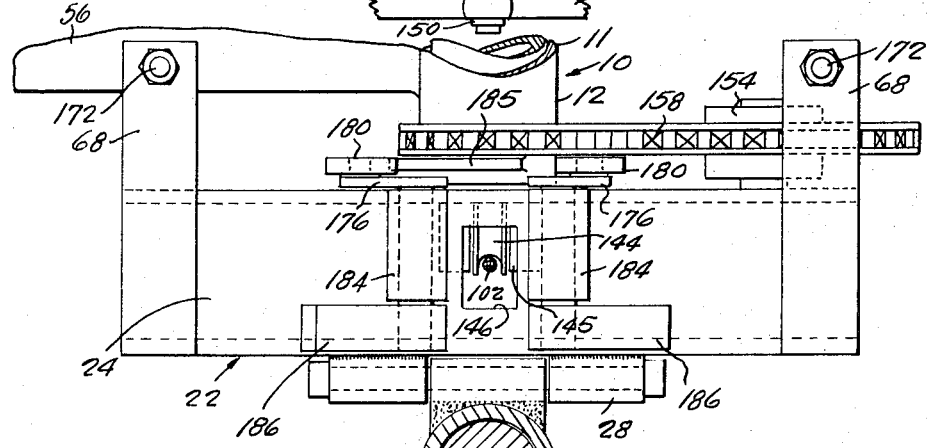
FIGURE 5 is a fragmentary horizontal section taken on the line 5—5 of FIGURE 4.

As also shown in FIGURES 4 and 5, the stop arms 68 have upstanding vertically adjustable stop screws 172 therethrough, provided with lock nuts 174, upon which the forward lateral arm 56 of the plow gangs are adapted to rest. Further, in order to prevent the plow from swinging, relative to the tractor beyond angles of approximately 40°, or so far as would permit the forward plows 54 from striking and damaging the rear tires (not shown) of the tractor, V-shaped levers 176 are provided, at opposite sides of the plow 10, and at a location behind the channel 22, which are pivoted, at their apices, as indicated at 178, on pendant lugs 180 on the channel 22. The levers 176 have normally upstanding arms 182 having lateral rollers 184, on their upper ends, which are adapted to be engaged by a cam collar 185, fixed on the carrier tube 12, between the members 20 and 22. As the plow swings to one side, the cam collar 185 depresses the related lever 176, so that its arm 186 is engaged by the bar 36 so as to limit the swing of the plow in that direction. The same thing happens when the plow is swung to the opposite side. Should the arm 186 of a lever 176 be already in the path of the bar 36, as a result of a partial swing of the tractor relative to the plow, rotation of the carrier tube 12, and hence the plows 54, will be corrected, so that a forward plow is prevented from being further rotated, until the tractor and the plow are in alignment with each other, so that a rear tractor tire is moved out of the path of such forward plow. Thus, in either forward or rearward movements of the plow and in any turns of the tractor relative to the plow, damaging of the rear tires of the tractor is prevented and full control of the operation of the plow is assured. The normally horizontal arms 186 of the levers 176 are yieldably and upwardly biased, as by means of helical springs 188 which are stretched between the arms 186 and the channel 22 so that they are retracted upwardly out of the path of the bar 36 when not engaged by the cam collar 185.

It will be seen from the foregoing that the plow gangs 52 can be reversed, raised, and lowered, by a single tractor operator, without leaving the seat of the tractor, simply by operating the movable tractor drawbar assembly 34. It will also be seen that with the connection of the plow frame 10 to the movable tractor drawbar assembly 34, and the universal connection of the furrow wheel assembly 76 to the rear end of the plow frame 10, the plow freely trails the associated tractor, with the furrow wheel 114 free to follow in its guide furrow.

While there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. In combination, a tractor having a stationary drawbar and a vertically-movable drawbar, a plow assembly comprising a horizontal frame connected at its forward end to said movable drawbar, a vertically-adjustable furrow wheel assembly rotatably connected to the rear end of the frame, means extending from the furrow wheel assembly to the movable drawbar of the tractor for elevating and depressing the furrow wheel assembly relative to the ground for elevating and depressing the frame, a carrier tube journalled on the frame, diametrically-opposed plow gangs fixed to the tube, and means for rotating the tube in opposite directions with the frame in an elevated position for reversing the relationships of the plow gangs relative to the ground and for positioning both plow gangs in horizontal positions out of contact with the ground, said reversing means comprising a transverse support fixed on the frame, a longitudinal shaft journalled on the support, a sprocket wheel fixed on the shaft behind the support, a toothed annulus fixed on and surrounding the carrier tube, a sprocket chain trained around said annulus and the sprocket wheel, a radial arm on said shaft, a two-way hydraulic cylinder pivoted at one on said support and having a piston rod pivoted to said radial arm, and two-way hydraulic operating means connected to the cylinder.

2. In combination, a tractor having a stationary drawbar and a vertically-movable drawbar, a plow assembly comprising a horizontal frame connected at its forward end to said movable drawbar, a vertically-adjustable furrow wheel assembly rotatably connected to the rear end of the frame, means extending from the furrow wheel assembly to the movable drawbar of the tractor for elevating and depressing the furrow wheel assembly relative to the ground for elevating and depressing the frame, a carrier tube journalled on the frame, diametrically-opposed plow gangs fixed to the tube, and means for rotating the tube in opposite directions with the frame in an elevated position for reversing the relationships of the plow gangs relative to the ground and for positioning both plow gangs in horizontal positions out of contact with the ground, said tractor drawbar having a horizontal cross bar, spring retracted levers pivoted on the frame and normally out of the path of said cross bar, cam means on the plow assembly adapted to engage a lever when the plow assembly is rotated to one side or the other of the frame so as to pivot a related lever behind and into the path of said cross bar for engagement by the cross bar for limiting the turning radius of the plow assembly relative to the tractor and for limiting rotation of the plow assembly on the frame until and unless the frame is aligned with the tractor.

3. A semi-mounted two-way gang plow adapted to be propelled forwardly by a tractor having a fore-and-aft draft means including a pair of rearwardly extending lower draft links, said plow comprising: an articulated non-rotatable frame having segments disposed on opposite sides of universal joint means, one of said segments being laterally offset from the fore-and-aft draft means, a rotable frame having spaced apart tubular portions journalled about said one segment and a second segment of said non-rotatable frame, said rotatable frame carrying opposed right- and left-hand plow bottoms, means interconnecting said second segment with the lower draft links of the tractor, a furrow wheel assembly mounted on said one segment, said lower draft links and said furrow wheel carrying means being operable to raise and lower the front and rear ends of the non-rotatable frame, and means operable to rotate said rotatable frame about said non-rotatable frame from one position in which one of the right and left bottoms are in ground-engaging position and the furrow wheel assembly is disposed to one side of the fore-and-aft draft means to another position in which the other of the right and left bottoms are in ground-engaging position and the furrow wheel assembly is disposed to the other side of the fore-and-aft draft means.

4. A semi-mounted two-way gang plow adapted to be propelled forwardly by a tractor having a fore-and-aft extending draft means including a pair of rearwardly extending draft links, said plow comprising: an articulated non-rotatable frame having segments disposed on opposite sides of universal joint means, the rear segment extending in a generally fore-and-aft direction and having its forward end normally laterally offset from the fore-and-aft extending draft means, a rotatable frame having spaced apart tubular portions journalled about the rear segment and a second segment of said non-rotatable frame, said rotatable frame carrying opposed right- and left-hand plow bottoms, means to connect said second segment to the lower draft links of the tractor for swinging movement about a vertically extending axis and a transversely extending axis, a furrow wheel assembly mounted on the rear segment, said lower draft links and said furrow wheel assembly being operable to raise and lower the front and rear ends of the non-rotatable frame, and means operable to rotate said rotatable frame about said non-rotatable frame between right- and left-hand plowing positions, the furrow wheel assembly being disposed to one side of the fore-and-aft draft means in one plowing position, and the furrow wheel assembly being disposed to the other side of the fore-and-aft draft means in the other plowing position.

5. A semi-mounted two-way gang plow adapted to be propelled forwardly by a tractor having a fore-and-aft extending draft means including a pair of rearwardly extending lower draft links, said plow comprising: an articulated non-rotatable frame having front and rear segments and an intermediate segment connected to the front and rear segments by universal joints at each end of the intermediate segment, the rear segment extending in a generally fore-and-aft direction and having its forward end normally laterally offset from the fore-and-aft draft means, a rotatable frame having spaced apart tubular portions journalled about the front and rear segments of said non-rotatable frame, said rotatable frame carrying opposed right- and left-hand plow bottoms, means interconnecting the non-rotatable frame means with the lower draft links of the tractor, a furrow wheel assembly mounted on the rear segment, said lower draft links and said furrow wheel assembly being operable to raise and lower the front and rear ends of the non-rotatable frame, and means operable to rotate said rotatable frame about said non-rotatable frame from one position in which one of the right and left bottoms are in ground-engaging position and the furrow wheel assembly is disposed to one side of the fore-and-aft draft means to another position in which the other of the right and left bottoms are in ground-engaging position and the furrow wheel assembly is disposed to the other side if the fore-and-aft draft means.

6. The invention set forth in claim 5 in which the means interconnecting the non-rotatable frame with the lower draft links of the tractor includes a first vertically extending pivot and a second transversely extending pivot.

7. A semi-mounted two-way gang plow adapted to be propelled forwardly by a tractor having rearwardly extending draft links, said plow comprising: an articulated non-rotatable frame having first and second segments disposed on opposite sides of universial joint means, the first segment being normally laterally offset from the fore-and-aft center line of the draft links, a rotatable frame having spaced apart portions journalled about the first and second segments, said rotatable frame carrying opposed right- and left-hand plow bottoms, swingable means connecting the second segment with draft links of the tractor, a furrow wheel assembly mounted on the first segment, the draft links and said furrow wheel assembly being operable to raise and lower the first and second segments of the non-rotatable frame, and means operable to rotate said rotatable frame about said non-rotatable frame from one position in which one of the right and left bottoms are in ground-engaging position and the first segment is disposed to one side of the fore-and-aft center line to another position in which the other of the right and left bottoms are in ground-engaging position and the first segment is disposed to the other side of the fore-and-aft center line.

8. A semi-mounted two-way gang plow adapted to be propelled forwardly by a tractor having a fore-and aft extending draft means including a pair of rearwardly extending lower draft links disposed to either side of the fore-and-aft center line of the draft means, said plow comprising: an articulated non-rotatable frame having front and rear segments and an intermediate segment connected to the front and rear segments by universal joints at each end of the intermediate segment, the rear segment extending in a generally fore-and-aft direction and having its forward end normaly laterally offset from the fore-and-aft center line, a rotatable frame having spaced apart cylindrical portions journalled about the front and rear segments of said non-rotatable frame, said rotatable frame carrying opposed right- and left-hand plow bottoms, a cross bar connectible at its ends to the lower draft links, a generally vertically extending pivot post mounted on said cross bar, sleeve means journalled about said pivot post, and means interconnecting the forward end of said front segment with said sleeve means, a furrow wheel assembly mounted on the rear segment, said lower draft links and said furrow wheel assembly being operable to raise and lower the front and rear ends of the non-rotatable frame, and hydraulically actuated power means to rotate said rotatable frame about said non-rotatable frame from one position in which one of the right and left bottoms are in ground-engaging position and the furrow wheel assembly is disposed to one side of the fore-and-aft center line to another position in which the other of the right and left bottoms are in ground-engaging position and the furrow wheel assembly is disposed to the other side of the fore-and-aft center line.

9. The invention set forth in claim 8 in which the front and rear segments are not in alignment.

References Cited

UNITED STATES PATENTS

| | | | |
|---|---|---|---|
| 2,879,853 | 3/1959 | Seng | 172—226 |
| 3,061,020 | 10/1962 | Mannheim | 172—285 |
| 3,174,556 | 3/1965 | Knapp et al. | 172—212 |

ABRAHAM G. STONE, *Primary Examiner.*

J. R. OAKS, *Assistant Examiner.*

UNITED STATES PATENT OFFICE

CERTIFICATE OF CORRECTION

Patent No. 3,357,501 December 12, 1967

Glen A. Watts

It is hereby certified that error appears in the above numbered patent requiring correction and that the said Letters Patent should read as corrected below.

Column 5, line 63, after "one" insert -- end --; column 6, line 25, for "rotable" read -- rotatable --; column 7, line 19, for "if" read -- of --.

Signed and sealed this 8th day of April 1969.

(SEAL)
Attest:

Edward M. Fletcher, Jr.
Attesting Officer

EDWARD J. BRENNER
Commissioner of Patents

UNITED STATES PATENT OFFICE
CERTIFICATE OF CORRECTION

Patent No. 3,357,501                      December 12, 1967

Glen A. Watts

It is certified that error appears in the above identified patent and that said Letters Patent are hereby corrected as shown below:

In the heading to the printed specification, lines 3 to 5, "Glen A. Watts, Caldwell, Idaho, assignor to Deere & Company, Moline, Ill., a corporation of Delaware" should read -- Glen A. Watts, Route 6, Caldwell, Idaho 83605 --.

Signed and sealed this 1st day of December 1970.

(SEAL)
Attest:

Edward M. Fletcher, Jr.                   WILLIAM E. SCHUYLER, JR.

Attesting Officer                        Commissioner of Patents